(12) United States Patent
Neet

(10) Patent No.: US 6,750,582 B1
(45) Date of Patent: Jun. 15, 2004

(54) STATOR WINDING HAVING CASCADED END LOOPS AND INCREASED COOLING SURFACE AREA

(75) Inventor: Kirk E. Neet, Saline, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/443,650

(22) Filed: May 22, 2003

Related U.S. Application Data

(63) Continuation-in-part of application No. 10/324,319, filed on Dec. 19, 2002.

(51) Int. Cl.$^7$ .............................................. H02K 17/00
(52) U.S. Cl. ...................................... 310/208; 310/201
(58) Field of Search ................................ 310/198–208; 29/605, 606

(56) References Cited

U.S. PATENT DOCUMENTS

| | | | |
|---|---|---|---|
| 693,579 A | 2/1902 | Wait | 310/201 |
| 3,270,229 A | 8/1966 | Ruelle et al. | 310/180 |
| 3,634,708 A | 1/1972 | Fisher | 310/195 |
| 5,097,167 A | 3/1992 | Kanayama et al. | 310/201 |
| 5,329,197 A | 7/1994 | Kudlacik | 310/198 |
| 5,331,244 A | 7/1994 | Rabe, deceased | 310/180 |
| 5,616,977 A | 4/1997 | Hill | 310/179 |
| 5,619,088 A | 4/1997 | Yumiyama et al. | 310/270 |
| 5,744,896 A | 4/1998 | Kessinger, Jr. et al. | 310/268 |
| 6,051,906 A | 4/2000 | Umeda et al. | 310/179 |
| 6,069,424 A | 5/2000 | Colello et al. | 310/58 |
| 6,140,735 A * | 10/2000 | Kato et al. | 310/201 |
| 6,373,164 B1 | 4/2002 | Nishimura | 310/207 |
| 2002/0079771 A1 | 6/2002 | Taji et al. | 310/179 |
| 2002/0117928 A1 | 8/2002 | Yasuhara et al. | 310/201 |

* cited by examiner

*Primary Examiner*—Dang Le
(74) *Attorney, Agent, or Firm*—MacMillan, Sobanski & Todd, LLC

(57) ABSTRACT

A dynamoelectric machine stator winding having cascaded end loops and increased cooling surface area is adapted to be placed in a plurality of circumferentially spaced axially-extending core slots in a surface of a generally cylindrically-shaped stator core. The stator winding includes a plurality of straight segments alternately connected at the first and second ends of the stator core by a plurality of end loop segments to form the winding. The end loops include first and second sloped sides meeting at an apex portion. The first and second sloped sides include at least one body portion offset in opposite radial directions to form a cascaded winding pattern and providing increased cooling surface area for the winding.

25 Claims, 5 Drawing Sheets

STATOR WINDING HAVING CASCADED END LOOPS AND INCREASED COOLING SURFACE AREA

CROSS-REFERENCE TO RELATED APPLICATIONS

This application is a continuation-in-part of co-pending U.S. patent application Ser. No. 10/324,319 filed Dec. 19, 2002.

BACKGROUND OF THE INVENTION

The present invention relates generally to stators for dynamoelectric machines and, in particular, to an stator winding for a dynamoelectric machine having cascaded end loops and an increased cooling surface area.

Dynamoelectric machines, such as alternating current electric generators, or alternators, are well known. Prior art alternators typically include a stator assembly and a rotor assembly disposed in an alternator housing. The stator assembly is mounted to the housing and includes a generally cylindrically-shaped stator core having a plurality of slots formed therein. The rotor assembly includes a motor rotor attached to a generally cylindrical shaft that is rotatably mounted in the housing and is coaxial with the stator assembly. The stator assembly includes a plurality of wires wound thereon, forming windings.

In one relatively new type of stator known as a high slot fill stator, the stator windings are formed of substantially straight portions that are located in the slots and end loop sections that connect two adjacent straight portions of the same phase and are formed in a predetermined multi-phase (e.g. three or six) winding pattern in the slots of the stator core. The rotor assembly typically includes opposed poles as part of claw fingers that are positioned around an electrically charged rotor coil. The rotor coil produces a magnetic field. When a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile battery.

The high slot fill stator is characterized by rectangular core slots and rectangular shaped conductors. The width, including any insulation, of the rectangular shaped conductors fit closely to the width, including any insulation, of the rectangular core slots. High slot fill stators are advantageous because they are efficient and help produce more electrical power per winding than other types of prior art stators. These stators, however, are disadvantageous because the windings are typically interlaced, in which the wires are required to alternate between outer and inner radial layers of each slot. These interlaced windings require an interlacing process to interlace the conductors of all the phases prior to inserting the winding into the core and therefore disadvantageously increase the complexity of placing the winding the stator. Other prior art stators have utilized hairpin conductors, in which separate U-shaped conductor pieces are placed in the core slots from an upper or lower axial end of the stator core and then welded together. While the hairpin conductors are not interlaced, the difficulty of manufacturing the stators is still increased because the opposing ends of the U-shaped conductors must be welded to form the stator winding.

During operation of the alternator, the stator windings increase in temperature as a result of the induced electrical current flowing through the winding resistance. As the stator windings increase in temperature, the efficiency of the alternator disadvantageously decreases.

It is desirable, therefore, to provide a stator having a winding that meets the requirements of a high slot fill stator but does not require the complex interlaced winding process or the hairpin conductors of the prior art. It is also desirable to provide a stator for a dynamoelectric machine that can provide improved cooling for the stator winding.

SUMMARY OF THE INVENTION

A stator winding for a dynamoelectric machine, such as an alternator, having cascaded end loops and increased cooling surface area is adapted to be placed in a plurality of circumferentially spaced axially-extending core slots in a surface of a generally cylindrically-shaped stator core. The stator winding includes a plurality of substantially straight segments alternately connected at the first and second ends of the stator core by a plurality of end loops or end loop segments to form the winding. The end loops include first and second sloped sides meeting at an apex portion. The first and second sloped sides include at least one body 25 portion offset in opposite radial directions. Each of the end loop segments form a cascaded winding pattern allowing sequential phase insertion, defined in more detail below and causing no interference between the end loop segments of each of the phases and providing increasing cooling surface area for the winding.

Preferably, the stator winding in accordance with the present invention advantageously provides improved cooling by shifting a predetermined number of phases to provide increased cooling surface area.

Preferably, the straight segments have a first cross-sectional shape wherein the area of the first cross-sectional shape of the straight segments is preferably substantially equal to the area of the cross-sectional shape of the end loop segments.

Alternatively, the area of the cross-sectional shape of the straight segments is substantially double the area of the cross-sectional shape of the end loop segments.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
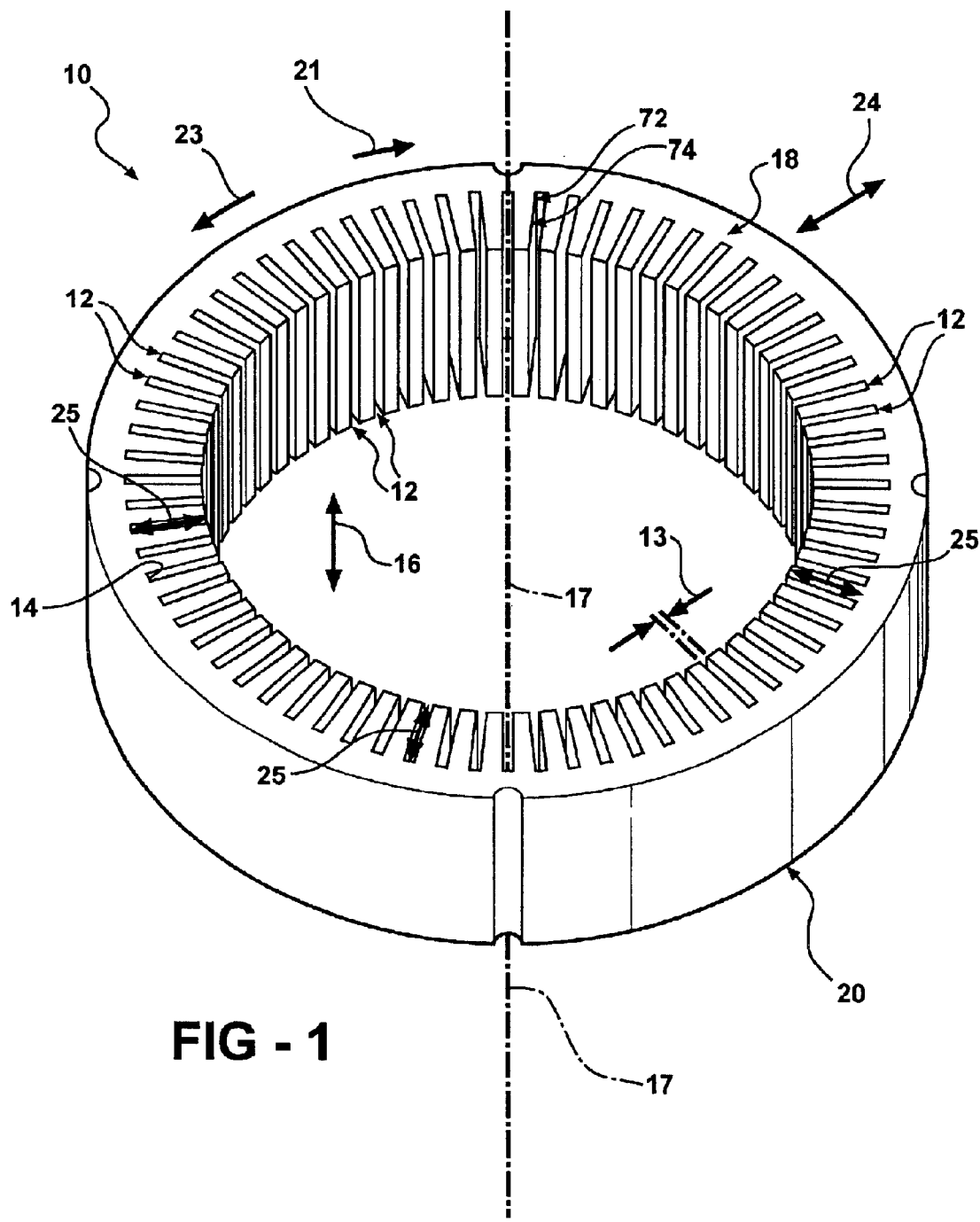
FIG. 1 is a perspective view of a stator core in accordance with the present invention.

Referring now to FIG. 1, a generally cylindrically-shaped stator core is indicated generally at 10. The stator core 10 includes a plurality of core slots 12 formed in a circumferential interior surface 14 thereof. The core slots 12 are generally rectangular in cross section and extend in a direction, indicated by an arrow 16, parallel to a central axis 17 of the stator core 10 between a first end 18 and a second end 20 thereof. The core slots 12 have a generally rectangular volume. An axially upward direction is defined as moving toward the first end 18 of the stator core 10 and an axially downward direction is defined as moving toward the second end 20 of the stator core 10. Preferably, the core slots 12 are equally spaced around the circumferential interior surface 14 of the stator core 10. A circumferential clockwise direction is indicated by an arrow 21 and a circumferential counterclockwise direction is indicated by an arrow 23. The core slots 12 define a depth 25 along a radial axis, indicated by an arrow 24, and are adapted to receive a stator winding, discussed in more detail below. A radial inward direction is defined as moving towards the central axis 17 of the stator core 10 and a radial outward direction is defined as moving away from the central axis 17. Alternatively, the core slots 12 may be formed in an exterior surface of the stator core 10, allowing for external insertion of the conductors into the core slots.

Referring now to FIGS. 2–5, a plurality of phase portions are indicated generally at 30, 32, 34, 36, 38 and 40 that form a continuous layer of a six phase stator winding, indicated generally at 42. Preferably, each of the phase portions 30, 32, 34, 36, 38 and 40 are formed of rectangular wire. Those skilled in the art will recognize that the phase portions 30, 32, 34, 36, 38 and 40 may also be formed of square wire (not shown) or rectangular wire with radii on the corners of the wire (not shown). Each of the phase portions 30, 32, 34, 36, 38 and 40 include a plurality of substantially identical straight segments 44, each of which is adapted to be received in a respective axially-extending core slot 12 of the stator core 10. The straight segments 44 are all located at the same radial distance from the central axis 17 of the stator core 10 and form a layer of the stator winding, indicated generally at 46. While the straight segments 44 of the phase portions 30, 32, 34, 36, 38 and 40 are shown generally coplanar in FIG. 2 for illustrative purposes, the straight segments 44 of the phase portions 30, 32, 34, 36, 38 and 40 are preferably adapted to be received by a radially curved surface, such as the interior surface 14 of the stator core 10 and, therefore, are not coplanar (i.e., the circumferential layer 46 is flattened into a plane in FIG. 2) but are are co-radial. The term co-radial, as utilized herein, is defined as two objects being at the same radial distance from an axis, such as the central axis of the stator core, and in the same cylindrical surface.

Each of the straight segments 44 has a first rectangular cross-sectional shape defined by a radial depth R1, and a circumferential width C1 and including any radii between the depths R1 and the widths C1 (not shown). An area A1, of the first rectangular cross-sectional shape of the straight segment 44, is defined by the dimensions R1 and C1 including any radii between R1 and C1, best seen in FIG. 4. Each of the straight segments 44, therefore, has the first rectangular cross sectional shape with an area A1.

The straight segments 44 of the first phase 30 are connected at the alternate axial ends 18 and 20 of the stator core 10 by a plurality of identical end loops or end loop segments 48 to form a continuous layer of a phase of the stator winding 42. The straight segments 44 of the first phase 30 are disposed in a plurality of core slots 12 beginning at a first slot (not shown) and incrementally around the stator core 10 at a predetermined pitch. Each of the end loop segments 48 of the first phase 30 include a first sloped portion or side 50 and a second sloped portion or side 52 connected to a respective straight segment 44 at one end thereof. The first sloped side 50 and the second sloped side 52 meet at an apex portion 54. On those end loop segments 48 at the second axial end 20 of the stator core 10, the first sloped side 50 extends in the circumferential clockwise direction 21 and in the axially downward direction from a lower portion of a straight segment 44. The first sloped side 50 includes an offset body portion 51 wherein the radially inward edge of the offset body portion 51 is at the same radial location as the radially inward edge of the straight segments 44 but the radially outward edge of offset body portion 51 is offset a predetermined distance in the radially inward direction. The second sloped side 52 extends in the circumferential counterclockwise direction 23 and in the axially downward direction from a lower portion of a second straight segment 44. The second sloped side 52 includes an offset body portion 53 wherein the radially inward edge of the offset body portion 53 is at the same radial location as the radially inward edge of the straight segment 44 but the radially outward edge of the offset body portion 53 is offset a predetermined distance in the radially inward direction. The predetermined distance for the offset portion 51 of the first sloped side 50 and the offset portion 53 of the second sloped side 52 is substantially equal to the respective lengths of the first sloped side 50 and the second sloped side 52.

Similarly, on those end loop segments 48 at the first axial end 18 of the stator core 10, the first sloped side 50 extends in circumferential clockwise direction 21 and in the axially upward direction from an upper portion of a straight segment 44. The first sloped side 50 includes the offset body portion 51 wherein the radially inward edge of the offset body portion 51 is at the same radial location as the radially inward edge of the straight segments 44 but the radially outward edge of offset body portion 51 is offset a predetermined distance in the radially inward direction. The second sloped side 52 extends in the circumferential counterclockwise direction 23 and in the axially upward direction from an upper portion of the straight segment 44. The second sloped side 52 includes the offset body portion 53 wherein the radially inward edge of the offset body portion 53 is at the same radial location as the radially inward edge of the straight segments 44 but the radially outward edge of the offset body portion 41 is offset a predetermined distance in the radially inward direction. The predetermined distance for the offset portion 51 of the first sloped side 50 and the offset portion 53 of the second sloped side 52 is substantially equal to the respective lengths of the first sloped side 50 and the second sloped side 52.

Figure 2:
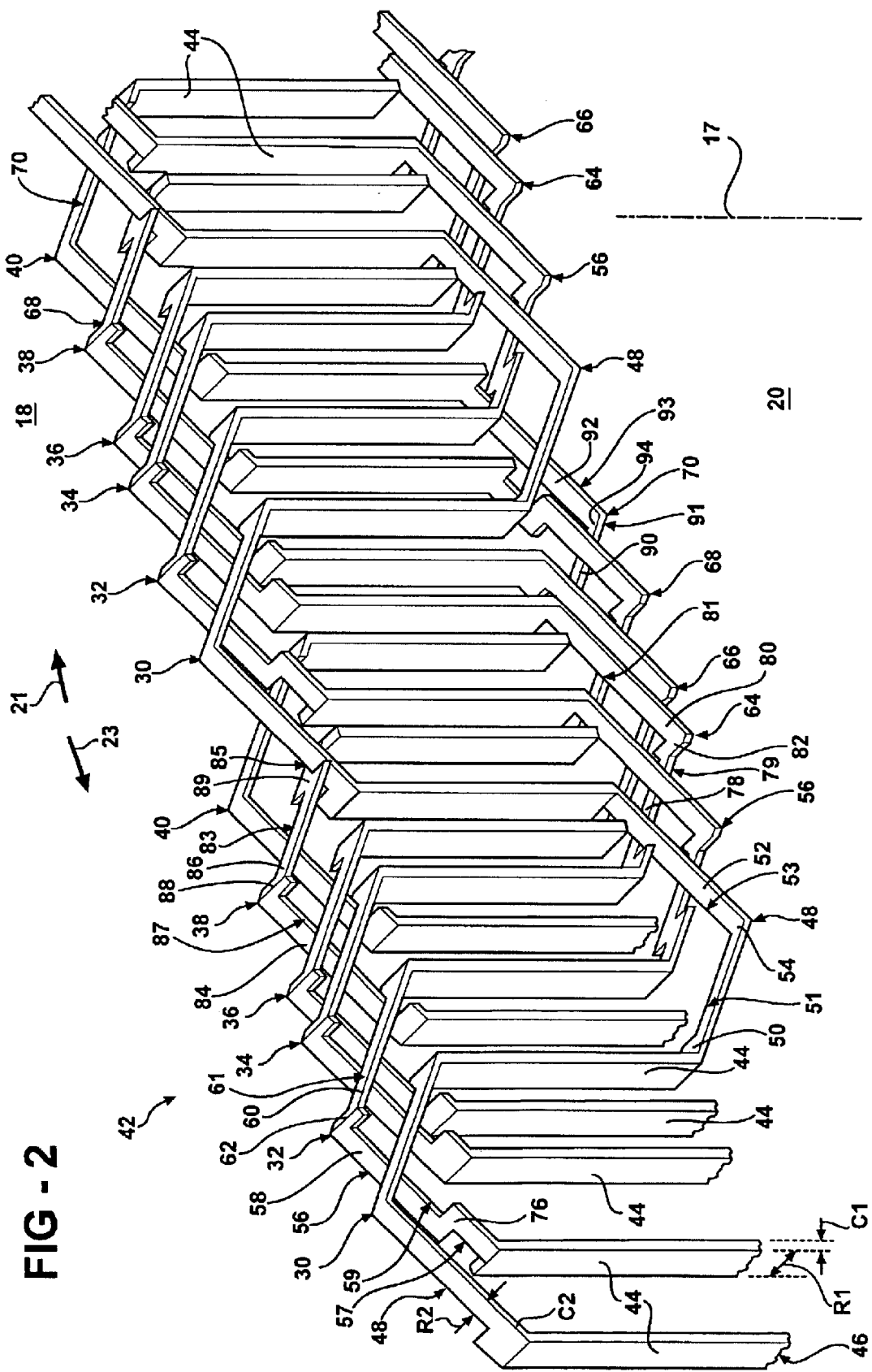
FIG. 2 is a perspective view of a stator winding in accordance with the present invention.
Figure 3:
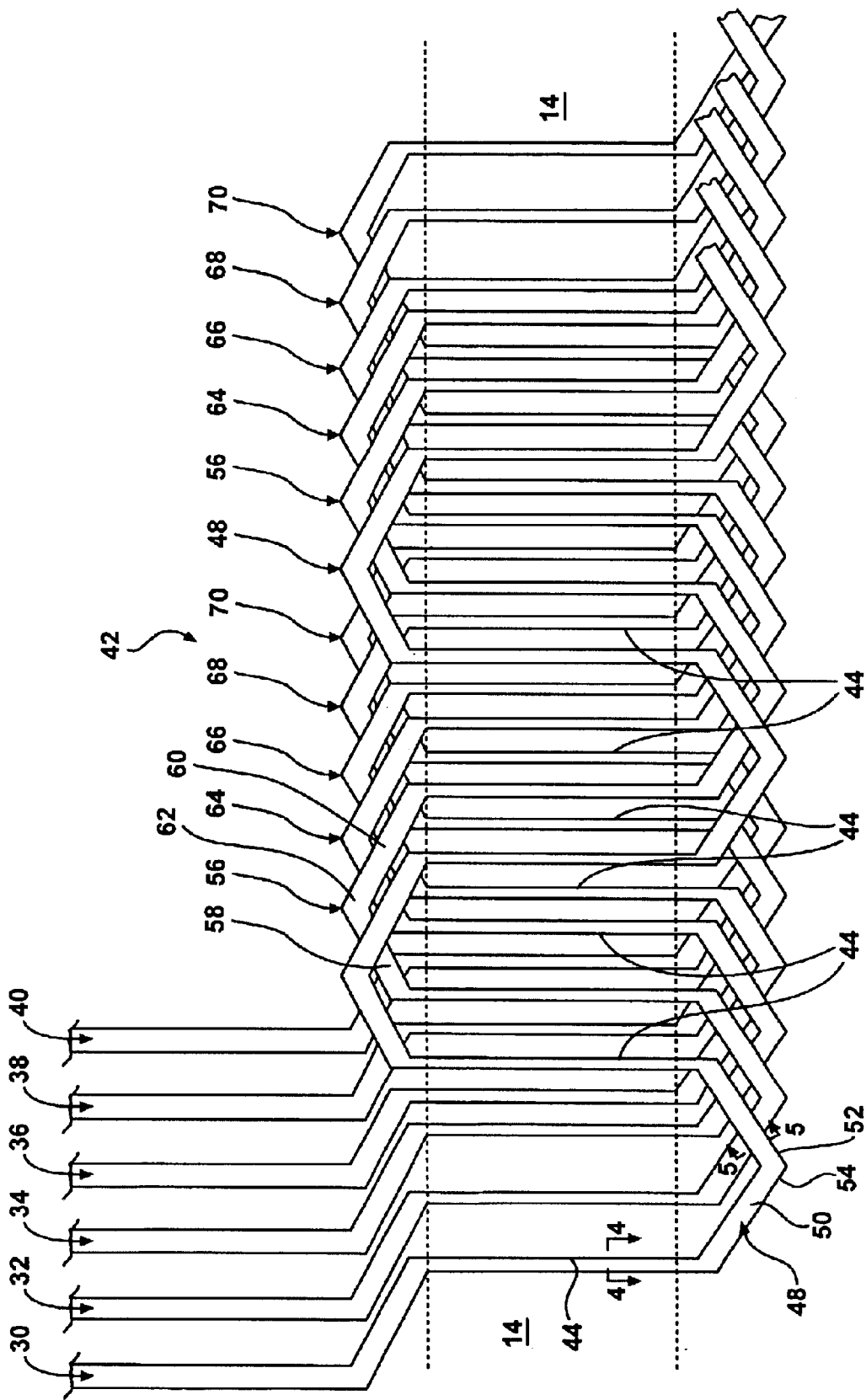
FIG. 3 is a schematic view of the stator winding shown in FIG. 1.
Figure 4:
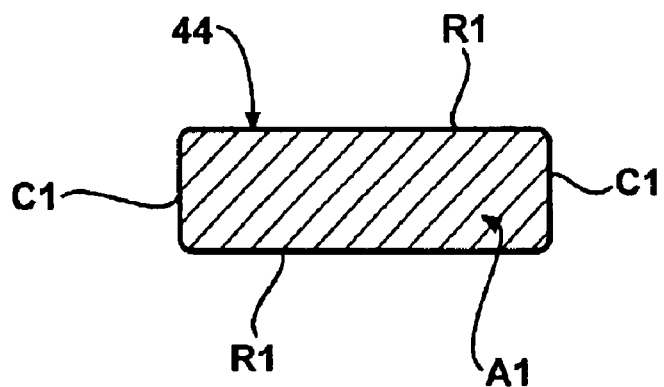
FIG. 4 is a cross-sectional view of a straight segment of the stator winding taken along line 4—4 in FIG. 3.
Figure 5:
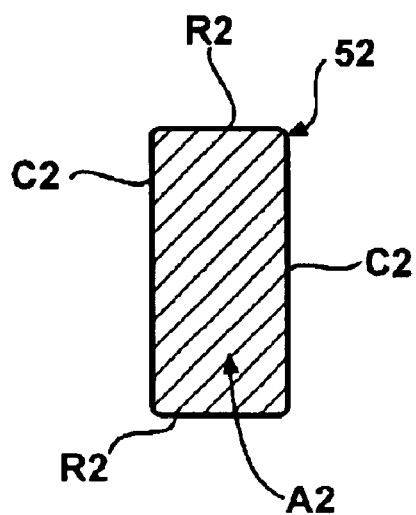
FIG. 5 is a cross-sectional view of an end loop segment of the stator winding taken along line 5—5 in FIG. 3.

The second sloped side 52 has a radial depth R2 and a circumferential width C2, best seen in FIG. 5. An area A2 of the rectangular cross-sectional shape of the second sloped side 52, is defined by the dimensions R2 and C2 including any radii between R2 and C2, best seen in FIG. 5. The area A2 of the second sloped side 52 is substantially equal to the area A1 of the straight segment 44. Preferably, the length of R2 is substantially half the length of R1, as seen in FIG. 2 and the length of C2 is substantially twice the length of the C1, as seen in FIG. 3. The first sloped side 50 has a substantially rectangular cross-sectional shape (not shown). Preferably, the area of the cross-sectional shape of the first sloped side 50 is substantially equal to the area A1 of the straight segment 44 and the area A2 of the second sloped side 52. Those skilled in the art, however, will appreciate that the length and width of the first sloped side 50 and the second sloped side 52 of the end loop segments 48 may be varied in any number of combinations to produce an area A2 that is substantially equal to A1 in order to provide constant electrical resistance throughout the length of the phase portion 30 while avoiding interference between cascaded end loops of adjacent phases as described below.

Alternatively, the end loop segments 48 have a cross-sectional shape having an area A2 that is substantially equal to one half of the area A1 of the first cross-sectional shape. Preferably, this is accomplished by forming the side R2 equal to substantially one half the length of the side R1 and by forming the side C2 equal to substantially the length of the side C1, as could be obtained by simple die cutting of the wire.

The straight segments 44 of the second phase 32 are connected at the alternate axial ends 18 and 20 of the stator core 10 by a plurality of identical end loop segments 56 to form a continuous layer of a phase of the stator winding 42. The straight segments 44 of the second phase 32 are disposed in a plurality of core slots 12 beginning at a second slot (not shown) and incrementally around the stator core 10 at a predetermined pitch. Each of the end loop segments 56 of the second phase 32 include a first sloped side 58 and a second sloped side 60 connected to a respective straight segment 44 at one end thereof. The first sloped side 58 and the second sloped side 60 meet at another respective end at an apex portion 62. On those end loop segments 56 at the second axial end 20 of the stator core 10, the first sloped side 58 extends in the circumferential clockwise direction 21 and in the axially downward direction from a lower portion of a straight segment 44. The first sloped side 58 includes a first offset body portion 57 wherein the radially inward edge of the offset body portion 57 is at the same radial location as the radially inward edge of the straight segments 44 but the radially outward edge of offset body portion 57 is offset a predetermined distance in the radially inward direction. The first sloped side 58 also includes a second offset body portion 59 wherein the radially outward edge of the offset body portion 59 is at the same radial location as the radially outward edge of the straight segments 44 but the radially inward edge of offset body portion 59 is offset a predetermined distance in the radially outward direction. The first offset body portion 57 and the second offset body portion 59 are connected by a radial transition portion 76. The radial transition portion 76 is placed on the end loop segment 56 in response to a crossing point of the sixth phase 40. The second sloped side 60 extends in the circumferential counterclockwise direction 23 and in the axially downward direction from a lower portion of a straight segment 44. The second sloped side 60 includes an offset body portion 61 wherein the radially inward edge of the offset body portion 61 is at the same radial location as the radially inward edge of the straight 44 but the radially outward edge of the offset body portion 61 is offset a predetermined distance in the radially inward direction. The predetermined distance for the offset portions 57 and 59 of the first sloped side 58 and the offset portion 61 of the second sloped side 60 is sufficient to avoid interfering with the end loop segments of the phases 30, 34, 36, 38, and 40 on the second axial end 20, discussed in more detail below.

Similarly, on those end loop segments 58 at the first axial end 18 of the stator core 10, the first sloped side 60 extends in circumferential clockwise direction 21 and in the axially upward direction from an upper portion of a straight segment 44. The first sloped side 60 includes the first offset body portion 57 wherein the radially inward edge of the offset body portion 57 is at the same radial location as the radially inward edge of the straight segments 44 but the radially outward edge of the offset body portion 57 is offset a predetermined distance in the radially inward direction. The first sloped side 58 includes the second offset body portion 59 wherein the radially outward edge of the offset body portion 59 is at the same radial location as the radially outward edge of the straight segments 44 but the radially inward edge of offset body portion 59 is offset a predetermined distance in the radially outward direction. The first offset body portion 57 and the second offset body portion 59 are connected by the radial transition portion 76. The radial transition portion 76 is placed on the end loop segment 56 in response to a crossing point of the sixth phase 40. The second sloped side 60 extends in the circumferential counterclockwise direction 23 and in the axially upward direction from an upper portion of the straight segment 44. The second sloped side 60 includes the offset body portion 61 wherein the radially inward edge of the offset body portion 61 is at the same radial location as the radially inward edge of the straight segments 44 but the radially outward edge of the offset body portion 61 is offset a predetermined distance in the radially inward direction. The predetermined distance for the offset portions 57 and 59 of the first sloped side 58 and the offset portion 61 of the second sloped side 60 is sufficient to avoid interfering with the end loop segments of the phases 30, 34, 36, 38, and 40 on the first axial end 18, discussed in more detail below.

Preferably, an area (not shown) of the cross-sectional shape of the first sloped side 58 and the second sloped side 60 is substantially equal to the area A1 of the straight segment 44 and the area A2 of the second sloped side 52.

The straight segments 44 of the third phase 34 are connected by a plurality of end loop segments 64 and the straight segments 44 of the fourth phase 36 are connected by a plurality of identical end loop segments 66. The straight segments 44 of the third phase 34 are disposed in a plurality of core slots 12 beginning at a third slot (not shown) and incrementally around the stator core 10 at a predetermined pitch. The straight segments 44 of the fourth phase 36 are disposed in a plurality of core slots 12 beginning at a fourth slot (not shown) and incrementally around the stator core 10 at a predetermined pitch. The end loop segments 64 and 66 are substantially identical and include a first sloped side 78 and a second sloped side 80 that meet at an apex portion 82 thereof. Preferably, each of the end loop segments 64 and 66 of the third phase 34 and fourth phase 36, respectively, includes an offset body portion 79 on the first sloped side 78 and an offset body portion 81 on the second sloped side 82 thereof. The offset body portion 79 is in the radial outward direction and the offset body portion 81 is in the radial inward direction. The length of the offset body portions 79 and 81 on the end loop segments 64 and 66 is sufficient to cause no interference with the end loop segments of adjacent phases.

The straight segments 44 of the fifth phase 38 are connected by a plurality of identical end loop segments 68. The straight segments 44 of the fifth phase 38 are disposed in a plurality of core slots 12 beginning at a fifth slot (not shown) and incrementally around the stator core 10 at a predetermined pitch. The end loop segments 68 include a first sloped side 84 and a second sloped side 86 that meet at an apex portion 88 thereof. Preferably, each of the end loop segments 66 of the fifth phase 36 are similar to the end loop segments 56 of the second phase 32 wherein the end loop segments 66 include a first offset body portion 83 and a second offset body portion 85 on the second sloped side 86 that are connected by a radial transition portion 89 and an offset body portion 87 on the first sloped side 84 thereof. The offset body portions 85 and 87 are in the radial outward direction and the offset body portion 83 is in the radial inward direction.

The straight segments 44 of the sixth phase 40 are connected by a plurality of identical end loop segments 70. The straight segments 44 of the sixth phase 40 are disposed in a plurality of core slots 12 beginning at a sixth slot (not shown) and incrementally around the stator core 10 at a predetermined pitch. The end loop segments 70 include a first sloped side 90 and a second sloped side 92 that meet at an apex portion 94 thereof. Preferably, each of the end loop segments 70 of the sixth phase 40 are similar to the end loop segments 48 of the first phase 30 wherein the first sloped side 90 includes an offset body portion 91 and the second sloped side 92 includes an offset body portion 93. Each of the offset body portions 91 and 93 are offset in the radial outward direction. The length of the offset body portions 91 and 93 of the end loop segments 70 is substantially equal to the respective lengths of the first sloped side 90 and the second sloped side 92 thereof.

The core slots (not shown) that receive the respective straight segments of the respective phase portions 30, 32, 34, 36, 38, and 40 may or may not be immediately adjacent each other, discussed in more detail below. The end loop segments of the phase portions 30, 32, 34, 36, 38, and 40 form a cascaded winding pattern shown in FIG. 2. The cascaded winding pattern shown in FIG. 2 and FIG. 3 also provides improved cooling for the stator winding 42 by radially shifting a predetermined number of the phases 30, 32, 34, 36, 38, and 40 to provide increased cooling surface area. For example in FIG. 2, the area between the phases 40 and 38 and between the phases 30 and 32 is increased, which allows for more air to flow between the phases, providing increased cooling.

A stator winding (not shown) with n number of phases (n=6 in FIGS. 2 and 3), is considered to have zero shifted phases when the phases are all disposed in a plurality of core slots 12 with the phases beginning in consecutive n core slots 12, for example, the first phase beginning in a slot number 1, the second phase beginning in a slot number 2 immediately adjacent the slot number 1, the third phase beginning in a slot number 3 immediately adjacent the slot number 2 and so forth including the nth phase beginning in slot number n, immediately adjacent the slot number n−1. For those skilled in the art it is known that the phases are also considered in phase, and therefore not radially shifted, if they are disposed in core slots 12 beginning in a slot positioned C*n slots from its non shifted slot, where C is any even number greater then equal to zero. For example, the first phase is considered not radially shifted when it is positioned in the core slots 12 beginning in slot number 1, C=0, or in slot number 13, C=2 or in slot number 25, C=4 and so forth. For a stator with radially shifted phases, the radially shifted phases are disposed in the core slots 12 beginning in a slot position B*n slots from its non shifted slot, where B is any odd number greater then zero. For example in FIG. 2, the phase 38 is disposed in the core slots 12 beginning in a slot number 8 which is radially shifted over 6 slots (n=6, B=1) from its non shifted location beginning in slot number 2 and the phase 40 is disposed in the core slots 12 beginning in slot number 10, which is radially shifted over 6 slots (n=6, B=1) from its non shifted location beginning in slot number 4. For those skilled in the art it is well known that these phases that are considered radially shifted, are out of phase with its non-shifted position by 180 electrical degrees.

Preferably, the stator winding 42 is formed in at least two radial layers, which is schematically shown as a first layer location 72 and a second layer location 74 in FIG. 1, which are substantially identical to the layer 46 of FIG. 2. Preferably, the layers 72 and 74 are radially spaced such that the straight segments of the first layer 72 are located radially outward of the straight segments of the second layer 74. The radial depth 25 of each of the core slots 12 of the stator core is adapted to receive the at least two layers 72 and 74. Alternatively, the radial depth 25 of each of the core slots 12 of the stator core 10 is adapted to receive more than two layers of the stator winding 42. Preferably, the circumferential length c1, including any insulation (not shown), of each of the straight segments 44 of the layers 72 and 74 is slightly less than the circumferential width 13, including any insulation (not shown), of the core slots 12, best seen in FIG. 1.

The stator winding 42 is assembled according to the following method: providing the generally rectangular conductors for the stator winding 60; forming a layer of each of the phases 30, 32, 34, 36, 38, and 40 of the stator winding 42 to shape; providing the stator core 10; sequentially inserting each of the phases 30, 32, 34, 36, 38, and 40 for the outermost layer 72, in a corresponding plurality of the core slots 12 of the stator core 10; and repeating the steps for layer 74 and any additional desired number of layers.

Each of the respective end loop segments 48, 46, 64, 66, 68, and 70 of the phases 30, 32, 34, 36, 38, and 40 of the stator winding 42 are cascaded, meaning that for each pass around the stator core 10, each of the phases can be inserted into the stator core 10 in a sequential order. For example, the sixth phase 40 is inserted for one substantial revolution about the circumference 14 of the stator core 10. After the phase 40 is inserted, the phase 38 may be inserted for one substantial revolution about the circumference 14 of the stator core 10. This pattern is repeated for each of the phases 36, 34, 32, and 30. As seen in FIGS. 2 and 3, when the phases 30, 32, 34, 36, 38, and 40 are inserted in this manner, the entire layer of each of the continuous layer of a phases 30, 32, 34, 36, 38, and 40 may be wound about the circumference 14 of the stator core 10 without interfering with any of the other phases.

Figure 6:
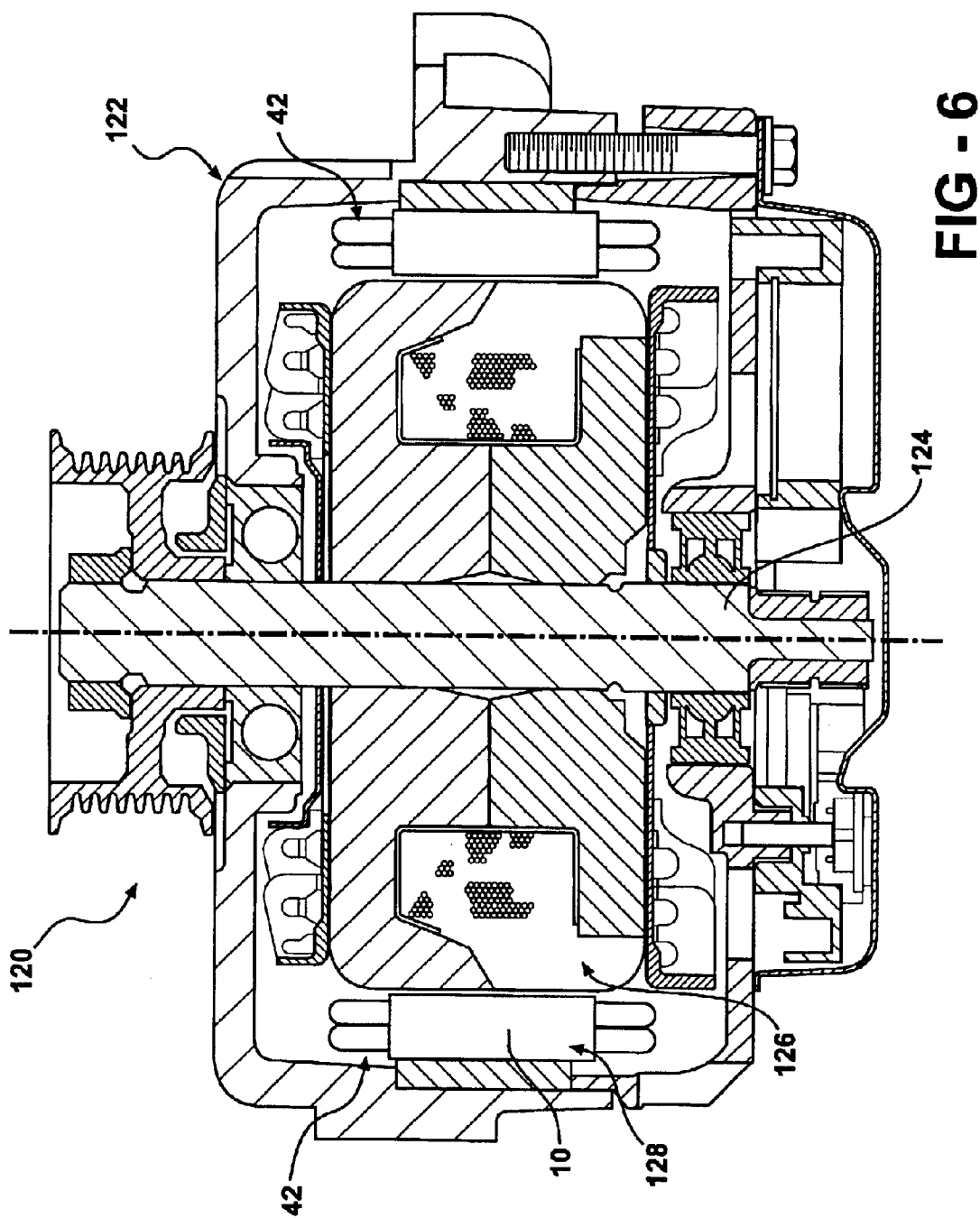
FIG. 6 is a cross-sectional view of an dynamoelectric machine in accordance with the present invention.

Referring now to FIG. 6, a dynamoelectric machine in accordance with the present invention is indicated generally at 120. The dynamoelectric machine is preferably an alternator, but those skilled in the art will appreciate that the dynamoelectric machine can be, but is not limited to, an electric motor, an integrated starter-motor, or the like. The dynamoelectric machine 120 includes a housing 122 having a shaft 124 rotatably supported by the housing 122. A rotor assembly 126 is supported by and adapted to rotate with the shaft 124. The rotor assembly can be, but is not limited to, a "claw pole" rotor, a permanent magnet non claw pole rotor, a permanent magnet claw pole rotor, a salient field wound rotor or an induction type rotor. A stator assembly 128 is fixedly disposed in the housing 122 adjacent the rotor assembly 126. The stator assembly 128 includes a stator core, such as the stator core 10 and winding with two radially aligned layers 72 and 74, wherein each layer is like such as the stator winding 42.

In accordance with the provisions of the patent statutes, the present invention has been described in what is considered to represent its preferred embodiment.

However, it should be noted that the invention can be practiced otherwise than as specifically illustrated and described without departing from its spirit or scope.

What is claimed is:
1. A stator for a dynamoelectric machine, comprising:
 a generally cylindrically-shaped stator core having a plurality of circumferentially spaced axially-extending core slots in a surface thereof, said core slots extending between a first and a second end of said stator core; and a stator winding including at least one layer of conductors having a plurality of phases, wherein said at least one layer of said phases includes substantially straight segments disposed in a plurality of said core slots that are located at the same radial distance from the central axis of the stator core having end loop portions connecting two straight segments of said phase, wherein said end loop segments form a cascaded winding pattern while keeping said end loop segments substantially radially within their respective layer, and wherein said straight segments have a circumferential width C1 and said end loop segments have a circumferential width C2 less than said circumferential width C1, and wherein at least one of said phases is radially shifted.

2. The stator according to claim 1 wherein said end loop segments of said phases include a first sloped side and a second sloped side that meet at an apex portion.

3. The stator according to claim 2 wherein at least one of said sloped sides of said end loop segments includes an offset body portion.

4. The stator according to claim 3 wherein at least one of said offset body portions is offset in a first radial direction and at least another of said offset body portions is offset in a second radial direction opposite said first radial direction.

5. The stator according to claim 4 wherein at least one of said sloped sides includes a body portion with a first body section offset in said second radial direction and a second body section offset in said first radial direction, a radial transition between said first and second body sections being placed in response to a crossing point of another phase.

6. The stator according to claim 5 wherein said stator winding includes a first phase, a second phase, a third phase, a fourth phase, a fifth phase and a sixth phase, and wherein said sloped sides of said first phase each include a body portion offset exclusively in a first radial direction, and wherein a one of said sloped sides of said second phase includes a body portion offset exclusively in said first radial direction, and wherein the other of said sloped sides of said second phase includes a body portion with a first body section offset in a second radial direction opposite said first radial direction and a second body section offset in said first radial direction, a radial transition between said first and second body sections being placed in response to a crossing point of said first phase, and wherein one of said sloped sides of said third phase includes a body portion offset exclusively in said first radial direction, wherein the other of said sloped sides of said third phase includes a body portion offset exclusively in said second radial direction, wherein said end loop segments of said fourth phase are substantially identical to said end loop segments of said third phase, and wherein one of said sloped sides of said fifth phase includes a body portion offset exclusively in said second radial direction, and wherein the other of said sloped sides of said fifth phase includes a body portion with a first body section offset in a first radial direction and a second body section offset in said second radial direction, a radial transition between said first and second body sections being placed in response to a crossing point of a sixth phase, and wherein said sloped sides of said sixth phase each include a body portion offset exclusively in said second radial direction.

7. The stator according to claim 1 wherein each of said straight segments has a first substantially rectangular cross-sectional shape, wherein each of said first sloped sides has a second substantially rectangular cross-sectional shape and wherein each of said second sloped sides has a third substantially rectangular cross-sectional shape.

8. The stator according to claim 7 wherein an area of said second cross-sectional shape area is equal to an area of said third rectangular cross-sectional shape.

9. The stator according to claim 7 wherein an area of said first cross-sectional shape is equal to said area of said second cross-sectional shape and said area of said third cross-sectional shape.

10. The stator according to claim 7 wherein a one of said second cross-sectional shape and said third cross-sectional shape is equal to substantially one half of said area of said first cross-sectional shape.

11. The stator according to claim 1 wherein said stator core slots have a generally rectangular volume.

12. The stator according to claim 1 wherein the width, including any insulation of said straight segments of said stator winding fit closely to the width, including any insulation, of said stator core slots.

13. The stator according to claim 1 wherein said stator winding includes at least two layers of conductors.

14. The stator according to claim 13 wherein said straight segments of said layers are positioned in one radial row in each slot.

15. A method for forming a winding a stator of a dynamoelectric machine, comprising the steps of:

a) providing a stator winding having at least three continuous phases, each of said phases of said stator winding being formed from a wire having a rectangular cross section, b) forming a first phase wherein said first phase has straight segments connected by a plurality of end loops, wherein end loops of said first phase are substantially identical and include first and second sloped sides meeting at an apex portion, wherein said sloped side each include a body portion offset exclusively in a first radial direction;

c) forming a second phase wherein said second phase has straight segments connected by a plurality of end loops, wherein end loops of said second phase are substantially identical and include first and second sloped sides meeting at an apex portion, wherein one of said sloped sides includes a body portion offset exclusively in said first radial direction, and wherein the other of said sloped sides includes a body portion with a first body section offset in a second radial direction opposite said first radial direction and a second body section offset in said first radial direction, a radial transition between said first and second body sections being placed in response to a crossing point of said first phase;

d) forming a third phase wherein said third phase has straight segments connected by a plurality of end loops, wherein end loops of said third phase are substantially identical and include first and second sloped sides meeting at an apex portion, wherein one of said sloped sides includes a body portion offset exclusively in said first radial direction, wherein the other of said sloped sides includes a body portion offset exclusively in said second radial direction;

e) providing a generally cylindrically-shaped stator core having a plurality of circumferentially spaced axially-extending core slots in a surface thereof, said core slots extending between a first and a second end of said stator core;

f) inserting said third phase in a plurality of said core slots beginning at a first core slot and incrementally around said stator core at a predetermined pitch;

g) inserting said second phase in a plurality of said core slots beginning at a second core slot and incrementally around said stator core at said predetermined pitch;

h) inserting said first phase in a plurality of said core slots beginning at a third core slot and incrementally around said stator core at said predetermined pitch, said phases forming a cascaded winding pattern, said stator winding providing increased cooling surface area, and wherein at least one of said phases is radially shifted.

16. The method according to claim 15 wherein in step b) said straight segments are formed having a first substantially rectangular cross-sectional shape and said end loops are formed having a second substantially rectangular cross-sectional shape.

17. The method according to claim 15 wherein in step b) each of said straight segments are formed having a first substantially rectangular cross-sectional shape, each of said first sloped sides are formed having a second substantially rectangular cross-sectional shape and each of said second sloped sides are formed having a third substantially rectangular cross-sectional shape.

18. The method according to claim 17 wherein in step b) an area of said first cross-sectional shape, an area of said second cross-sectional shape, and an area of said third cross-sectional shape are formed substantially equal.

19. The method according to claim 17 wherein an area of said second substantially rectangular cross section formed in step b) is substantially one half of an area of said first substantially rectangular cross section.

20. The method according to claim 17 wherein in step b) said stator winding is formed in at least two layers of conductors.

21. A dynamoelectric machine, comprising:
a housing;
a shaft rotatably supported by said housing;
a rotor supported by and adapted to rotate with said shaft; and
a stator fixedly disposed in said housing adjacent said rotor, said stator comprising:
  a generally cylindrically-shaped stator core having a plurality of circumferentially spaced axially-extending core slots in a surface thereof, said core slots extending between a first and a second end of said stator core; and
  a stator winding including at least one layer of conductors having at least six phases,
  wherein a first phase has straight segments disposed in a plurality of said core slots beginning at a first slot and incrementally around said stator core at a predetermined pitch, wherein end loops of said first phase are substantially identical and include first and second sloped sides meeting at an apex portion, wherein said sloped sides each include a body portion offset exclusively in a first radial direction, and
  wherein a second phase has straight segments disposed in a plurality of said core slots beginning at a second slot and incrementally around said stator core at said predetermined pitch, wherein end loops of said second phase are substantially identical and include first and second sloped sides meeting at an apex portion, wherein one of said sloped sides includes a body portion offset exclusively in said first radial direction, and wherein the other of said sloped sides includes a body portion with a first body section offset in a second radial direction opposite said first radial direction and a second body section offset in said first radial direction, a radial transition between said first and second body sections being placed in response to a crossing point of said first phase, and
  wherein a third phase has straight segments disposed in a plurality of said core slots beginning at a third slot and incrementally around said stator core at said predetermined pitch, wherein end loops of said third phase are substantially identical and include first and second sloped sides meeting at an apex portion, wherein one of said sloped sides includes a body portion offset exclusively in said first radial direction, wherein the other of said sloped sides includes a body portion offset exclusively in said second radial direction, and
  wherein a fourth phase has straight segments disposed in a plurality of said core slots beginning at a fourth slot and incrementally around said stator core at said predetermined pitch and includes end loops substantially identical to said end loops of said third phase, and
  wherein a fifth phase has straight segments disposed in a plurality of said core slots beginning at a fifth slot and incrementally around said stator core at said predetermined pitch, wherein end loops of said fifth phase are substantially identical and include first and second sloped sides meeting at an apex portion, wherein one of said sloped sides includes a body portion offset exclusively in said second radial direction, and wherein the other of said sloped sides includes a body portion with a first body section offset in a first radial direction and a second body section offset in said second radial direction, a radial transition between said first and second body sections being placed in response to a crossing point of a sixth phase, and
  wherein said sixth phase has straight segments disposed in a plurality of said core slots beginning at a sixth slot and incrementally around said stator core at said predetermined pitch, wherein end loops of said sixth phase are substantially identical and include first and second sloped sides meeting at an apex portion, wherein said sloped sides each include a body portion offset exclusively in said second radial direction
  wherein each of said end loops form a cascaded winding pattern and keeping said end loops radially within their respective layer, and
  wherein at least one of said phases is radially shifted and said stator winding exhibits improved cooling by providing increased cooling surface area.

22. The dynamoelectric machine according to claim 21 wherein said stator core slots have a generally rectangular volume.

23. The dynamoelectric machine according to claim 21 wherein the width, including any insulation of said straight segments of said stator winding fit closely to the width, including any insulation, of said stator core slots.

24. The dynamoelectric machine according to claim 21 wherein said stator winding includes at least two layers of conductors.

25. The dynamoelectric machine according to claim 24 wherein said straight segments of said layers are positioned in one radial row in each slot.

* * * * *